United States Patent
Darwish et al.

(10) Patent No.: US 12,475,243 B2
(45) Date of Patent: Nov. 18, 2025

(54) FILENET DATA EXTRACTION AUTOMATION

(71) Applicant: Bank of America Corporation, Charlotte, NC (US)

(72) Inventors: Tahlil Darwish, Addison, TX (US); Ivana Onema, Charlotte, NC (US); Anthony Rodriguez, Addison, TX (US)

(73) Assignee: Bank of America Corporation, Charlotte, NC (US)

( * ) Notice: Subject to any disclaimer, the term of this patent is extended or adjusted under 35 U.S.C. 154(b) by 171 days.

(21) Appl. No.: 18/244,340

(22) Filed: Sep. 11, 2023

(65) Prior Publication Data

US 2025/0086304 A1    Mar. 13, 2025

(51) Int. Cl.
   G06F 21/62    (2013.01)
   G06F 21/60    (2013.01)
   H04L 9/40     (2022.01)

(52) U.S. Cl.
   CPC ........ *G06F 21/6218* (2013.01); *G06F 21/602* (2013.01); *G06F 21/6227* (2013.01); *G06F 21/6245* (2013.01); *H04L 63/20* (2013.01)

(58) Field of Classification Search
   CPC .............. G06F 21/6218; G06F 21/602; G06F 21/6227; G06F 21/6245; H04L 63/20
   See application file for complete search history.

(56) References Cited

U.S. PATENT DOCUMENTS

| | | | |
|---|---|---|---|
| 8,667,169 B2 | 3/2014 | Patil et al. | |
| 9,614,826 B1* | 4/2017 | McCorkendale | G06F 21/60 |
| 2010/0188684 A1* | 7/2010 | Kumara | G06F 21/608 |
| | | | 358/1.14 |
| 2016/0162522 A1* | 6/2016 | Ganatra | G06F 16/164 |
| | | | 707/741 |
| 2023/0252184 A1* | 8/2023 | Chirputkar | G06F 21/6245 |
| | | | 726/1 |
| 2024/0062569 A1* | 2/2024 | Mittal | G06V 10/82 |

OTHER PUBLICATIONS

W. Zhu et al. "IBM FileNet P8 Platform and Architecture", IBM Redbooks, Published on Apr. 15, 2011, Retrieved from [https://www.redbooks.ibm.com/abstracts/SG247667.html] on Apr. 29, 2025. (Year: 2011).*

* cited by examiner

Primary Examiner — Robert B Leung
(74) Attorney, Agent, or Firm — Weiss & Arons LLP

(57) ABSTRACT

An apparatus and method for evaluating and removing confidential data within a FileNet archive is provided. The disclosure may include a compilation of a list of globally accessible sites that contain archived FileNet links and files potentially containing confidential data. The disclosure may include a FileNet Document Extraction script that may be designed to facilitate an extraction of archived files from a list of open sites stored in FileNet repositories. The disclosure may also include a comprehensive metadata compilation accomplished by querying a FileNet archive with a parameter-based approach. The disclosure may include a script that intelligently extracts a document name from metadata of a file or a source and applies a slicing mechanism to isolate a file type. In addition, the disclosure may include an argument-based system that allows users to customize FileNet code script behavior according to specific user needs and requirements.

4 Claims, 9 Drawing Sheets

```
def clear_fileshare_folder(self,scan):
    ***
    Deletes all files in the extraction path
    ***
    extract_path = '/apps/opt/filenetdocuments/'+ scan + "/*"
    filets = glob.glob(extract_path)
    for f in files:
        os.remove(f)

def get_full_site_dictionary(self, sites_dictionary, url, start_date,
end_date):
    ***Creates query statement for FileNet CMIS discovery service.
    Interchangcheable URL pulled from site dictionary keys.
    Returns site dictionary populated with metadata.
    ***
```

FIG. 4

```
repoID = self.repositoryID
WSDL_URL = url
query_base = "SELECT ID, [Document Name], SPCONTAINERURL, [SPDocCreatorName],
[SPDocCreator], [SPRecCreator], [DateCreated] FROM SHAREPOINT_DOC WHERE SPCONTA
#query_base = "SELECT" FROM SHAREPOINT_DOC WHERE SPCONTAINERURL like"
sie_dictionary = sites_dictionary
file_name = 1
entries_to_remove = []
found_files = 0 for key in site dictionary:
url=key
creation_date_fram = self.get_date_fram(start_date, end_date)
query = query_base+ "*" + url + "%" + creation_date_frame discovery_results_dictionary = self.discovery(repoID, query, WSDL_URL)
object_length = discovery results dictionary['numItems']
# checking if SPURL does not have documents registered
if object_lenght**0:
    entries_to_remove.append(key)
else:
for current object in object length/:
```

FIG. 5

```
        found_files += 1
    #if docid and doctitle != "No title found." and MIMEtype != "No MIME
type found.": #we will determine the final condition when we understand
what the NULL val of a docid looks like
    if docid: #we will determine the final condition when we understand
what the NULL val of a docid looks like
        site_dictionary[key].append((file_name,docid,docname,file_
            location,SPLastModifiedBy,SPDocCreatorName,SPDocCreator,
            SPRecCreator,DateCreated))
        file_name += 1 for key in entries_to_remove:
    site_dictionary.pop.(key,None)

full_site_dictionary = site_dictionary
print("this many files found!"+str(found_files))
return full_site_dictionary def get_extension(self,docname):
    *Gets file extension from Document Name*
    #Find the last occurrence of "." in the input string
    last_dot_index = docname.rfind(".")
```

FIG. 6A

```
# Check if a dot was found in the input string
if last_dot_index != -1:
    extension_type = docname[last_dot_index:]
else:
    #if no dot was found, return error,
    return "No extension found"

return str(extension_type)

def Change_file_permissions(self, path):
    for root, dirs, files in os.walk(path):
        for f in files:
            file_path = os.path.join(root,f)
            os.chmod(file_path, 0o755)

def Change_directory_permissions(self):
    directories = ['/apps/opt/filenetdocuments/standard', '/apps/opt/filenet
    documents/ad_hoc']
    path = 'apps/opt/filenetdocuments'
    for directory in directories:
        dir_path = os.path.join(path, directory)
        os.chmod(dir_path, 0o755)
```

FIG. 6B

FILENET DATA EXTRACTION AUTOMATION

FIELD OF TECHNOLOGY

Aspects of the disclosure relate to data extraction.

BACKGROUND OF THE DISCLOSURE

The disclosure relates to an apparatus and method for automated FileNet data extraction. In particular, the disclosure relates to automated confidentiality evaluation and extraction of files archived in FileNet.

There is currently an inability to scan globally accessible files, e.g., SharePoint files, archived by a particular data archive, e.g., FileNet, for data retention. FileNet, an International Business Machines (IBM) Inc. company, provides software to help enterprises manage content and processes. FileNet is an enterprise content management system (ECM) used to manage and store documents and files. FileNet is capable of archiving files, e.g., SharePoint files. SharePoint is a web-based collaborative platform that integrates natively with Microsoft software.

A Global Information Security (GIS) Data at Rest (DAR) team must determine whether confidential data may be exposed in SharePoint files flagged for FileNet archiving. Thus, a major goal of the provided apparatus and method is to determine whether files archived by a SharePoint site into an IBM FileNet contain confidential data. SharePoint is merely an exemplary globally accessible site and is a non-limiting feature of the instantly claimed invention—other types of files and filesites may also be evaluated by this approach.

Once a file is archived in FileNet, the file is no longer in the SharePoint site being scanned for confidential data. There are currently 16 globally accessible SharePoint sites containing 14,622 files retained by FileNet. These files are accessible globally. As a result, there is a potential for confidential data exposure within the globally accessible site. And without an ability to remove the exposed data, organizations and people affected may experience reputational damage, operational loss, and regulatory risk. The root cause of this problem is a lack of proper DAR monitoring controls for FileNet archiving, with an add-on for SharePoint files.

It would therefore be desirable to provide a specially designed apparatus and method to evaluate and extract confidential data from FileNet for use with any processor, e.g., desktop/mobile/laptop device.

It would be further desirable to use such an apparatus and method for further storing confidential files and purging confidential files at a desired time.

It would be yet further desirable to provide an apparatus and method to evaluate and extract confidential, globally accessible files from FileNet.

It would be yet further desirable to enable a technology that permits a user to automatically extract confidential SharePoint files from FileNet archives, and tag, process, store, and purge the files at a desired time.

SUMMARY OF THE DISCLOSURE

An apparatus and method for automated FileNet data extraction is provided. The apparatus and method may include, for example, a computing device, a processor within the computing device, and a globally accessible site. The globally accessible site may be, for example, a SharePoint site.

The apparatus and method may include a specialized code script that enables automated FileNet data extraction. The apparatus and method may include a FileNet Document Extraction script designed to facilitate an extraction of archived files from a list of open SharePoint sites stored in FileNet repositories.

The apparatus and method may also include a comprehensive file metadata compilation by querying a FileNet archive with a parameter-based approach. The apparatus and method may include a script that intelligently extracts a document name from metadata of a file or a source and then applies a slicing mechanism to isolate a file type.

In addition, the apparatus and method may include an argument-based system that allows users to customize FileNet code script behavior according to specific arguments, needs, and requirements of a user.

The apparatus and method may reduce storage of confidential documents within a centralized data repository. The apparatus and method may also increase security within a centralized data repository. The centralized data repository may be, for example, FileNet.

The apparatus and method may receive a globally accessible site from a Data at Reset (DAR) team on a computing device. Globally accessible sites, such as SharePoint, may archive files on FileNet.

The apparatus and method may provide a scanning application to scan files within a FileNet archive for confidential data. The scanning application may identify, for example, whether FileNet files contain a first comma separated values (CSV) file. The scanning application may store a first CSV file in a local memory address in a centralized data repository. The scanning application may also extract metadata from the first CSV file.

The apparatus and method may set script arguments including, for example, scan type (scan), environment (env), start_date, and end_date. Scan type may be, for example, standard or ad hoc. Standard scan type means the scanning is performed over the last month's files. Ad hoc scan type means the scanning is performed over a customized date range of files.

The apparatus and method may automatically pass a Unified User Management (UUM) key, service ID, and password into a UUM Authentication Service. The apparatus and method may automatically output a UUM Session Key from the UUM Authentication Service.

The apparatus and method may automatically create a FileNet Simple Object Access Protocol (SOAP) Application Programming Interface (API) Client using the UUM key to establish a connection to a FileNet Content Management Interoperability Services (CMIS) discovery and object service. The apparatus and method may then create a dictionary containing a sitelist of Uniform Resource Locators (URLs) as keys and an empty list as values.

Further, the apparatus and method may utilize an argument-based query including, for example, a document ID, document name, a last modified by date, and a true file path. The argument-based query may form a base query. The apparatus and method may then automatically create a date range determined by scan type (e.g., standard or ad hoc). The apparatus and method may then automatically run a query statement to the FileNet CMIS discovery and object service for each key in the dictionary, using the sitelist of URLs, the creation date, and the base query.

The apparatus and method may manually email the DAR team for instruction when evaluated files do not contain a first CSV file. Following the query statement, the apparatus and method may output a second CSV file using a processor. The second CSV file may be an output of a scanning application.

The apparatus and method may identify, using a processor, whether a URL contains documents. When the URL contains documents, the apparatus and method may store the documents in a new memory address, the new memory address included in the centralized data repository where the documents are being stored. The apparatus and method may then append the second CSV file metadata to the dictionary.

The apparatus and method may call an object service operation for each key in the dictionary to retrieve a content stream. The apparatus and method may then convert the content stream into a file object and transfer the file object into a multiprotocol fileshare. Then the apparatus and method may convert the contents of each item in the dictionary into CSV format, write the converted contents of each item in the dictionary into the second CSV file, and manually email the second CSV file to the DAR team. When the URL does not include documents, the apparatus and method may remove the corresponding key and URL from the dictionary.

BRIEF DESCRIPTION OF THE DRAWINGS

The objects and advantages of the invention will be apparent upon consideration of the following detailed description, taken in conjunction with the accompanying drawings, in which like reference characters refer to like parts throughout.

FIG. 4 shows an illustrative diagram in accordance with the principles of the disclosure.

FIG. 5 shows an additional illustrative diagram in accordance with the principles of the disclosure.

FIG. 6A shows another illustrative diagram in accordance with the principles of the disclosure.

FIG. 6B shows yet another illustrative diagram in accordance with the principles of the disclosure.

DETAILED DESCRIPTION OF THE DISCLOSURE

Figure 1:
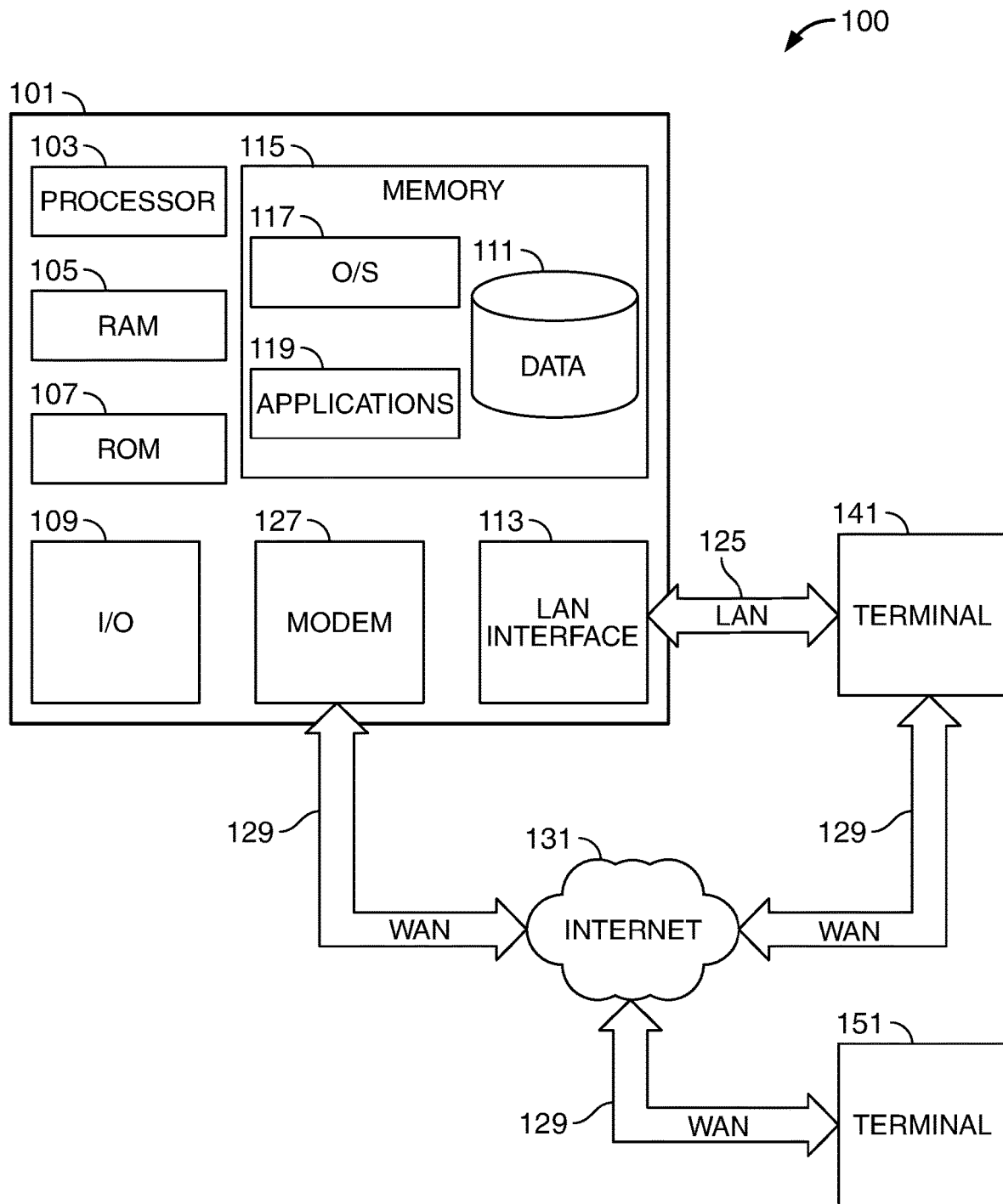
FIG. 1 shows an illustrative block diagram of a system that may be configured in accordance with the principles of the disclosure.

An apparatus and method to evaluate and extract confidential data and files in FileNet are provided. The apparatus and method accomplish this by automation with an Application Programming Interface (API) that International Business Machines, Inc. (IBM) uses to target FileNet archives for scanning. FileNet archives containing SharePoint files are given global access. Global access means any person on the network that uses the IBM API may obtain access to the FileNet files. Therefore, global permission to access the FileNet archive exists. Because of this global access, confidential information must be properly identified and controlled for data security purposes.

The apparatus and method may query the API through a token or crawler targeting a specific population of files. The specific population of files may then be placed into a fileshare, recompiled, and verified. The unique mechanism utilizes wrapping parameters around the downloaded content as described below. Further, the types of files, dates, and other information are uniquely gathered. And a separate file monitoring program, e.g., Symantec Data Loss Prevention (DLP) Vontu, may be used.

A FileNet archive at a bank is a file archive. When there is no longer a need for certain data, such data must still be retained for a certain period to comply with banking standards. Thus, even unnecessary files must be evaluated from a security perspective. A security mechanism is required to evaluate the existence of confidential data in FileNet files. Banks may not allow confidential data to be leaked or lost. There is currently no automated way to evaluate FileNet archives efficiently and accurately for confidential data. The following apparatus and method make FileNet files available for confidentiality evaluation.

A certain subpopulation of files may be identified if, e.g., they meet certain criteria for evaluation. Symantec DLP Vontu is, e.g., Vontu Protect—a technology that may be used for confidentiality evaluation. Automation may be run to pull the FileNet files based on the file archive, file types, and date periods involved. Automation is an automatic action that occurs based on intelligent programs and mechanisms.

Once a command to initiate data extraction is triggered, all FileNet files are pulled down for evaluation and narrowed based on exposed confidential data. A scanning application scans the FileNet files using a standard or ad hoc scan based on file creation dates. A standard scan pulls FileNet files with creation dates from the past month. An ad hoc scan pulls FileNet files based on customized creation date ranges.

Files may also be pulled and stored in a multiprotocol fileshare. Vontu may then scan and purge the stored confidential files after a predetermined length of time, e.g., a month, in storage.

The GIS DAR team may compile a list of globally accessible SharePoint sites that contain archived FileNet links and files potentially containing confidential data. The GIS DAR may define requirements enhancing the DAR scanning process to include the inventory SharePoint files archived with a FileNet add-on. The FileNet Document Extraction script may be designed to facilitate an extraction of archived files from a list of open SharePoint sites stored in FileNet repositories. The script may start by querying FileNet repositories for archived files hosted on globally accessible SharePoint sites. For each archived file found, the script may retrieve its metadata and download the file onto a multiprotocol fileshare, which may act as a temporary location for further scanning and processing by, e.g., Vontu.

The script then collects relevant metadata associated with each document, such as file name, file path, creator information, etc. This information is compiled and generated into a comma separated value (CSV) document (for example, an Excel file), which may serve as a summary report used when files are flagged as potential security breaches. Comprehensive metadata compilation may be accomplished by querying the FileNet archive with a parameter-based approach. The script may include a systemic process for gathering metadata associated with each URL. The implementation of this method and apparatus allows for seamless manipulation and retrieval of metadata throughout the script.

The next step of the method and apparatus is then triggered—a dictionary of URLs with values is pulled. A UUM key may then be used for UUM authentication. UUM authentication is a request for a token. This token allows access to the FileNet application programming interface (API). The dictionary is first filled with file types and dates. Another API action may retrieve an actual file by converting a bite stream into a proper file type for confidentiality evaluation.

One unique feature of the claimed method and apparatus is its scalability. The architecture of the Python script is designed to accommodate a growing number of URLs and associated files/metadata. It can handle a large volume of data without compromising efficiency or performance. The script introduces a novel process for seamless file conversion by leveraging document names. Unlike conventional approaches that rely on manual file type specification or complex applications, the script utilizes a simple, yet effective, technique to automatically determine and convert files into their correct file types.

The next step of the method and apparatus is to obtain a document name retrieved from the original query. The script intelligently extracts the document name from the metadata of the file or a source, and then applies a slicing mechanism to isolate the file type portion. By analyzing the extracted file type information, the script dynamically performs the appropriate conversion, ensuring compatibility and integrity of the converted files. The file is then saved as a bite stream in FileNet and converted into its correct file type—for example, a Word or PDF file. This is a critical component because the files in the FileNet archive exist in bite (content) stream format. And bite or content stream format files cannot be evaluated without additional manipulation. This process enables the proper manipulation of FileNet bite stream files into their correct file types to allow for confidential data evaluation.

In the FileNet archives, a document name indicates its file type. For example, a document may indicate its file type at the end of its name string. Thus, a document name string may be parsed, chopped up, and used to determine file type. A CSV file may then be created and emailed to the DAR analyst team to locate files of that type. The located files may then be evaluated for confidential data.

The apparatus and method may include a specialized code script that enables automated FileNet data extraction. The apparatus and method may include a FileNet Document Extraction script designed to facilitate an extraction of archived files from a list of open SharePoint sites stored in FileNet repositories. Such script may include the following lines of code:

```
def clear_fileshare_folder (self, scan):
    ***
    Deletes all files in the extraction path
    ***
    extract_path = '/apps/opt/filenetdocuments/' + scan + "/*"
    filets = glob.glob (extract_path)
    for f in files:
        os.remove(f)
```

The script may introduce a unique and flexible argument-based system that allows users to customize the script behavior according to specific requirements. By passing four key arguments, apparatus users may precisely define (1) scan type, (2) repository environment (env), (3) scan start date, and (4) scan end date, thereby tailoring the script's functionality to their needs. This unique argument-based system empowers users to fine-tune a script's behavior adapting to various use cases and specific data requirements.

The apparatus and method may include a comprehensive metadata compilation by querying a FileNet archive with a parameter-based approach. To this end, the apparatus and method may include a script that intelligently extracts a document name from metadata of a file or a source and apply a slicing mechanism to isolate a file type.

The apparatus and method may also include an argument-based system that allows users to customize FileNet code script behavior according to specific needs and requirements of a user. As such, the code script may include the following lines of code:

```
def get_full_site_dictionary (self, sites_dictionary, url, start_date,
    end_date):
    ***Creates query statement for FileNet CMIS discovery service.
    Interchangeable URL pulled from site dictionary keys.
    Returns site dictionary populated with metadata.
    ***
    repoID = self.repositoryID
    WSDL_URL = url
    query_base = "SELECT ID, [Document Name],
    SPCONTAINERURL, [SPDocCreatorName], [SPDocCreator],
    [SPRecCreator, [DateCreated] FROM SHAREPOINT_DOC
    WHERE SPCONTAINERURL
    #query_base = "SELECT" FROM SHAREPOINT_DOC WHERE
    SPCONTAINERURL like"
    sie_dictionary = sites_dictionary
    file_name = 1
    entries_to_remove = [ ]
    found_files = 0
    for key in site dictionary:
    url=key
    creation_date_fram = self.get_date_fram(start_date, end_date)
    query = query_base+ "*" + url + "%" + creation_date_fram
    discovery_results_dictionary = self.discovery (repoID, query,
    WSDL_URL)
    object_length = discovery results dictionary ['numItems']
    # checking if SPURL does not have documents registered
    if object_length**0:
        entries to remove.append(key)
    else:
    for current object in object length/:
    found_files += 1
    #if docid and doctitle != "No title found." and MIMEtype != "No
    MIME
    type found.": #we will determine the final condition when we
    understand
    what the NULL val of a docid looks like
    if docid: #we will determine the final condition when we understand
    what the NULL val of a docid looks like
        site_dictionary[key].append((file_name, docid, docname, file_
        location, SPLastModifiedBy, SPDocCreatorName,
    SPDocCreator,
        SPRecCreator, DateCreated))
        file_name += 1
    for key in entries_to_remove:
        site_dictionary.pop.(key,None)
    full_site_dictionary = site_dictionary
    print("this many files found!"+str(found_files))
    return full_site_dictionary = self.discovery (repoID, query,
    WSDL_URL)
def get_extension (self, docname):
    *Gets file extension from Document Name*
    #Find the last occurrence of"." in the input string
    last_dot_index = docname.rfind(".")
    # Check if a dot was found in the input string
    if last_dot_index != -1:
        extension_type = docname[last_dot_index:]
    else:
        #if no dot was found, return error,
        return "No extension found"
    return str(extension_type)
def Change_file_permissions (self, path):
    for root, dirs, files in os.walk(path):
        for f in files:
```

```
        file_path = os.path.join(root, f)
        os.chmod(file_path, 0o755)
def Change_directory_permissions(self):
    directories = ['/apps/opt/filenetdocuments/standard', '/apps/opt/filenet
    documents/ad_hoc']
    path = 'apps/opt/filenetdocuments'
    for directory in directories:
        dir_path = os.path.join(path, directory)
        os.chmod(dir_path, 0o755)
```

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and applications illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more applications that process received executable instructions, perform power management routines or other suitable tasks. Application program(s) 119 may utilize one or more decisioning processes for the processing of communications received from the stylus and/or the payment instrument as detailed herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
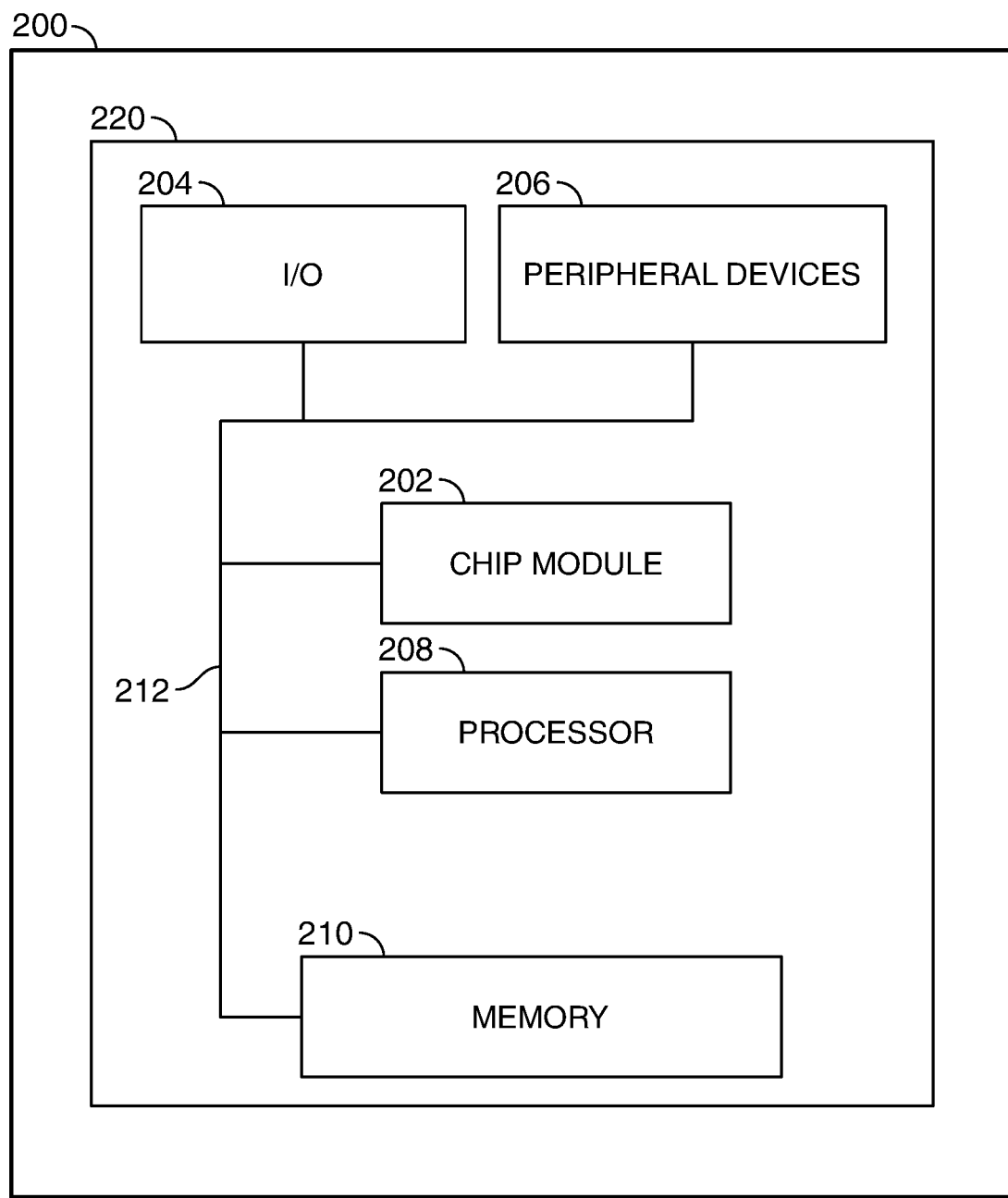
FIG. 2 shows illustrative apparatus that may be configured in accordance with the principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3A:
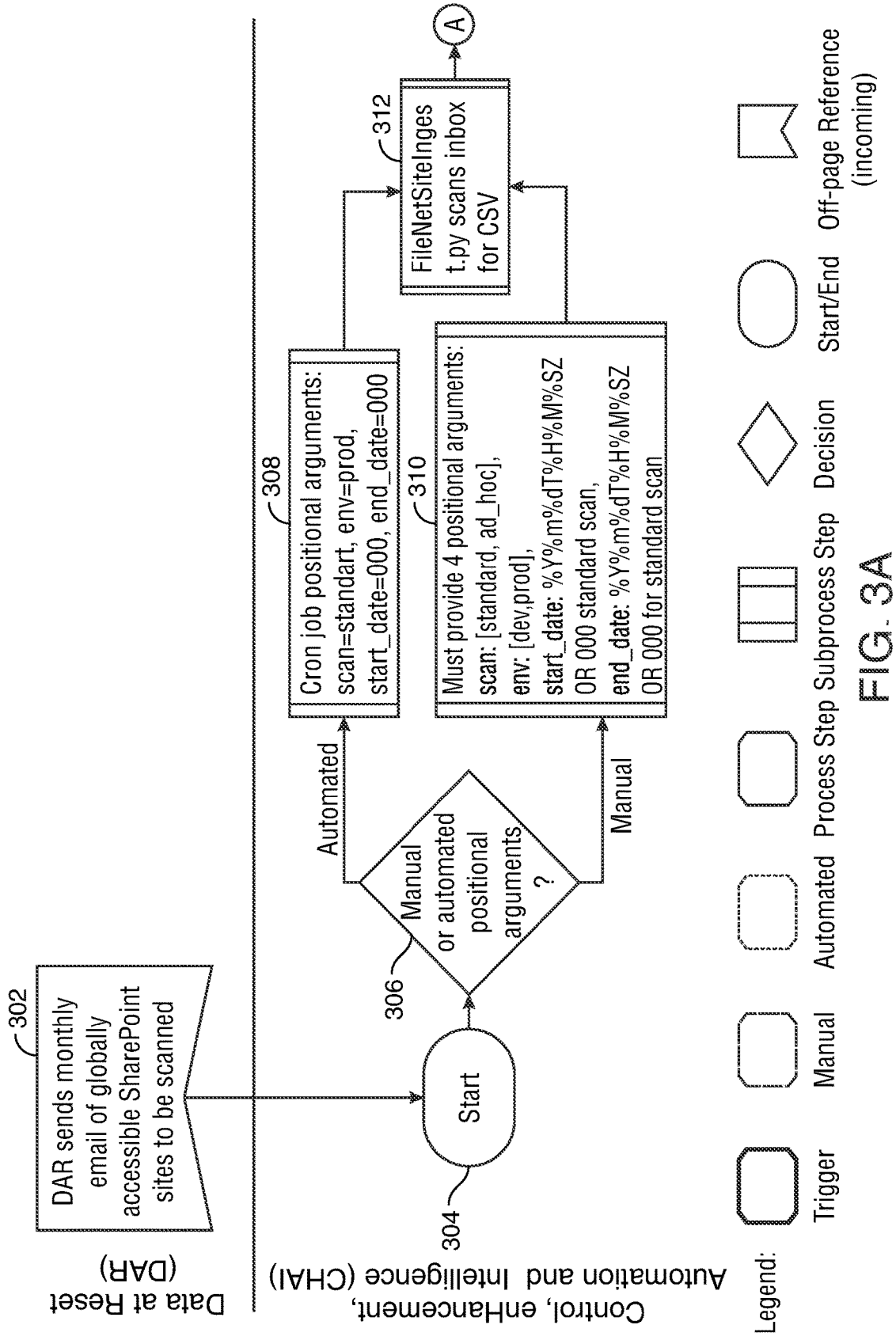
FIG. 3A shows another illustrative flowchart in accordance with the principles of the disclosure.

FIG. 3A shows another illustrative flowchart in accordance with the principles of the disclosure. The illustrative flowchart is titled "Control, enHancement, Automation, and Intelligence (CHAI)-FileNet Automation Flowchart." An incoming off-page reference 302 shown in column "Data at Reset (DAR)." DAR 302 sends monthly email of globally accessible SharePoint sites to be scanned.

Following DAR 302, CHAI is initiated at Start 304. From there, Decision 306 is implemented. Decision 306 asks the question of whether there are: "Manual or automated positional arguments?" If automated, the subprocess step 308 is initiated.

Subprocess step 308 runs code as follows: "Cron job positional arguments: scan=standard, env=prod, start_date=000, end_date=000." If the positional arguments are manual, however, then subprocess step 310 is initiated, instead of subprocess step 308.

Subprocess step 310 runs code as follows: "Must provide 4 positional arguments: scan: [standard, ad_hoc], env: [dev, prod], start_date: % Y % m % dT % H % M % SZ OR 000 standard scan, end_date: % Y % m % dT % H % M % SZ OR 000 for standard scan."

Following either subprocess step 308 or subprocess step 310, subprocess step 312 is initiated. Subprocess step 312 runs code as follows: "FileNetSiteIngest.py scans inbox for CSV."

Figure 3B:
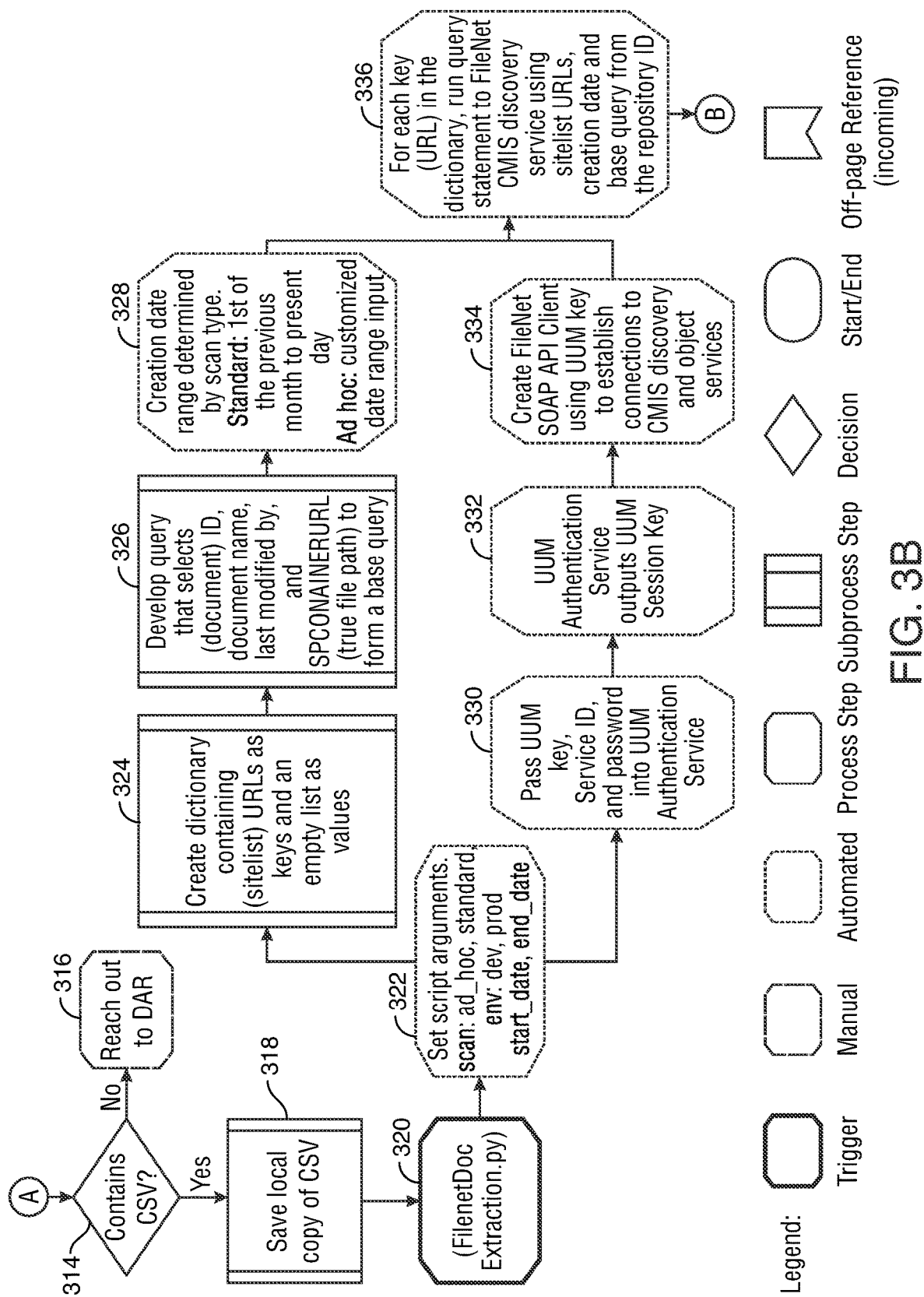
FIG. 3B shows yet another illustrative flowchart in accordance with the principles of the disclosure.

FIG. 3B is a continuation of the illustrative flowchart. After subprocess step 312, Decision 314 is implemented. Decision 314 is a question for the system whether the inbox: "Contains CSV?" If the inbox does not contain CSV, then automated step 316 begins. Automated step 316 initiates the system to reach out to DAR to inquire about the CSV. If the inbox does contain CSV, then subprocess step 318 is initiated.

Subprocess step 318 is an instruction to "Save local copy of CSV." This step will save a copy of the CSV locally on the system. Following subprocess step 318, Trigger 320 is initialized. Trigger 320 is a program instruction as follows: "(FilenetDocExtraction.py)." This program will initiate a document extraction protocol.

Following Trigger 320, the system begins automated step 322. automated step 322 is an instruction to set the script arguments as follows: "scan: ad_hoc, standard. Env: dev, prod. start_date, end_date." Following Automated step 322, the protocol forks into two directions.

In one direction, subprocess step 324 begins. Subprocess step 324 is a protocol instruction to create a dictionary containing a sitelist of URLs as keys and an empty list as values. Following subprocess step 324, subprocess step 326 initiates. Subprocess step 326 is a protocol instruction to develop a query that selects document ID, document name, last modified by, and SPCONAINERURL (true file path) to form a base query. Following subprocess step 326, automated step 328 starts. Automated step 328 is an automated protocol instruction to create a date range determined by scan type as follows: "Standard: 1st of the previous month to present day. Ad hoc: customized date range input."

In the other direction, automated step 330 begins. Automated step 330 is an automated protocol instruction to pass UUM key, service ID, and password into a UUM Authentication Service. Following automated step 330, automated step 332 begins. Automated step 332 instructs the UUM Authentication Service to output a UUM Session Key. Following automated step 332, automated step 334 is an additional set of instructions. Automated step 334 calls the system to create a FileNet SOAP API Client using the UUM Session Key to establish connections to CMIS discovery and object services.

Following both automated step 328 and automated step 334, the system protocol meets back up with itself at automated step 336. Automated step 336 is an automated protocol instruction for each key (URL) in the dictionary to run a query statement. Each query statement is run to FileNet CMIS discovery service using sitelist URLs, creation date, and base query from the repository ID.

Figure 3C:
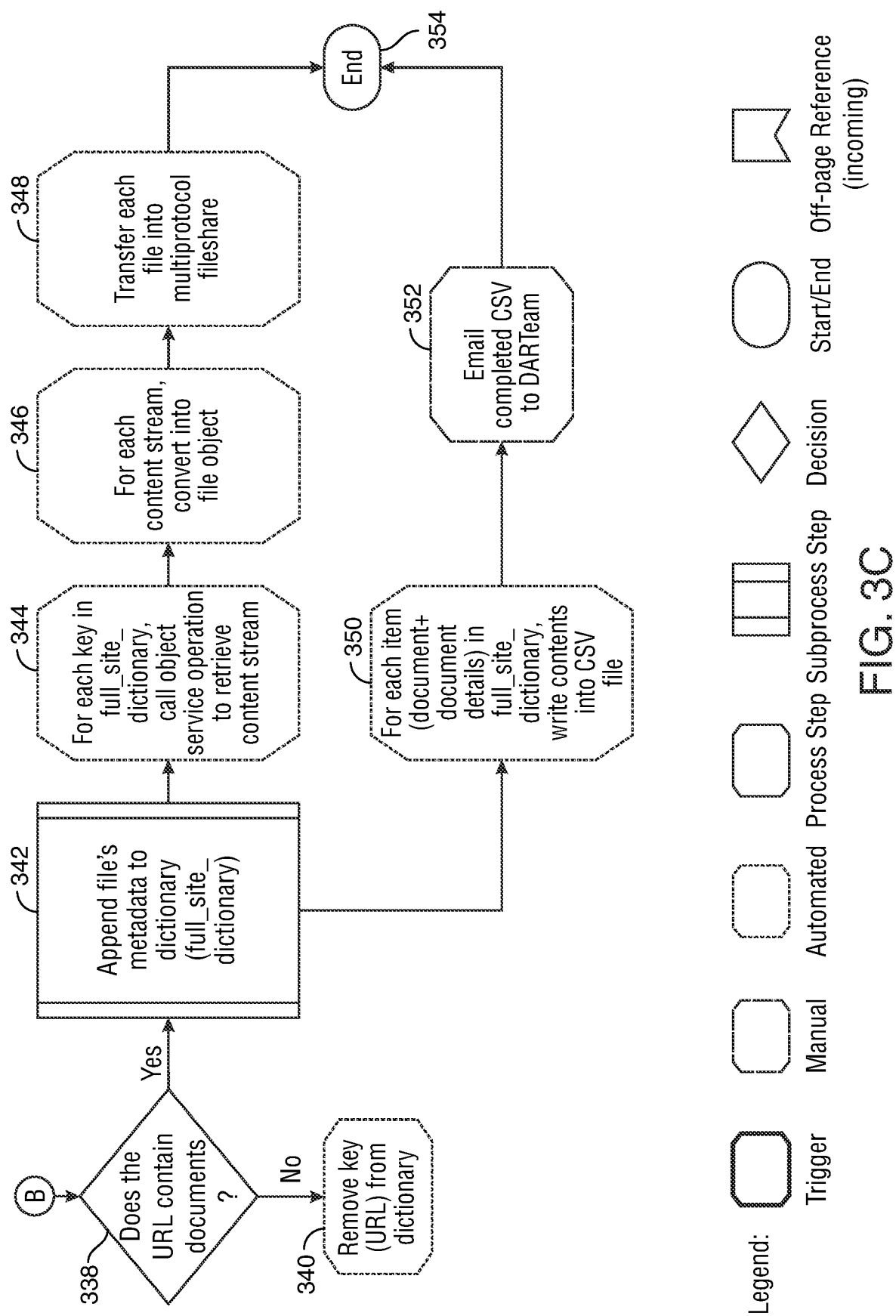
FIG. 3C shows yet another illustrative flowchart in accordance with the principles of the disclosure.

FIG. 3C is a continuation and completion of the illustrative flowchart. After automated step 336, the system protocol begins Decision 338. Decision 338 is another query for the system: "Does the URL contain documents?" If the URL does not contain documents, then automated step 340 begins. Automated step 340 is an automated protocol to remove the key (URL) from the dictionary. Otherwise, if the URL does contain documents, then subprocess step 342 begins.

Subprocess step 342 is a protocol instruction to append a file's metadata to the dictionary (full_site_dictionary). From there, the protocol splits in two directions.

In one direction, automated step 344 begins. Automated step 344 is an automated process whereby, for each key in the full_site_dictionary, a call object service operation is used to retrieve a content stream. Following automated step 344, the system begins automated step 346. Automated step 346 is an instruction for each content stream to convert into a file object. Following that step, automated step 348 starts. Automated step 348 is an instruction to transfer each file into a multiprotocol fileshare.

In the other direction, automated step 350 initializes simultaneously and parallel to automated step 344. Automated step 350 is an automated instruction for each item (document and document details) in full_site_dictionary. The instruction is to write the contents of each item into a CSV file. Following automated step 350, manual step 352 begins. Manual step 352 is a manual process whereby the completed CSV file is manually emailed to the DARTeam.

Following both manual step 352 and automated step 348, the system ends in End 354. End 354 is the final step that terminates the protocol.

FIG. 4 shows yet another illustrative diagram in accordance with the principles of the disclosure. More specifically, FIG. 4 shows a code script for deleting all files in the extraction path. This segment of code reads as follows:

```
def clear_fileshare_folder (self, scan):
    ***
    Deletes all files in the extraction path
    ***
    extract_path = '/apps/opt/filenetdocuments/' + scan + "/*"
    filets = glob.glob (extract_path)
```

```
for f in files:
    os.remove(f)
```

In addition, FIG. 4 shows a method of obtaining a full site dictionary with at least five parameters (self, sites_dictionary, url, start_date, and end_date). This segment of code reads as follows:

```
def get_full_site_dictionary (self, sites_dictionary, url, start_date,
    end_date) :
    ***Creates query statement for FileNet CMIS discovery service.
    Interchangeable URL pulled from site dictionary keys.
    Returns site dictionary populated with metadata.
    ***
```

FIG. 5 shows yet another illustrative diagram in accordance with the principles of the disclosure. The diagram in FIG. 5 is a schematic code script for use with embodiments set forth herein. The code script defines a query base. This segment of code reads as follows:

```
repoID = self.repositoryID
WSDL_URL = url
query_base = "SELECT ID, [Document Name],
SPCONTAINERURL, [SPDocCreatorName], [SPDocCreator],
[SPRecCreator, [DateCreated] FROM SHAREPOINT_DOC
WHERE SPCONTAINERURL
#query_base = "SELECT" FROM SHAREPOINT_DOC WHERE
SPCONTAINERURL like"
sie_dictionary = sites_dictionary
file_name = 1
entries_to_remove = [ ]
found_files = 0
```

FIG. 5 also describes the creation of a key for a site dictionary. This segment of code reads as follows:

```
for key in site dictionary:
url=key
creation_date_fram = self.get_date_fram(start_date, end_date)
query = query_base+ "*" + url + "%" + creation_date_fram
```

Finally, FIG. 5 is a diagram for the code script for determining whether documents are registered. This segment of code reads as follows:

```
discovery_results_dictionary = self.discovery (repoID, query,
    WSDL_URL)
object_length = discovery results dictionary ['numItems']
# checking if SPURL does not have documents registered
if object_length**0:
    entries to remove.append(key)
else:
    for current object in object length/:
```

FIG. 6A shows still another illustrative diagram in accordance with the principles of the disclosure. FIG. 6A shows an instruction in the form of a code script to look for relevant files containing document IDs and document titles. This segment of code reads as follows:

```
found_files += 1
#if docid and doctitle != "No title found." and MIMEtype != "No
MIME
type found.": #we will determine the final condition when we
understand
what the NULL val of a docid looks like
if docid: #we will determine the final condition when we understand
what the NULL val of a docid looks like
    site_dictionary[key].append((file_name, docid, docname, file_
    location, SPLastModifiedBy, SPDocCreatorName,
SPDocCreator,
    SPRecCreator, DateCreated))
    file_name += 1
for key in entries_to_remove:
    site_dictionary.pop.(key,None)
full_site_dictionary = site_dictionary
print("this many files found!"+str(found_files))
return full_site_dictionary = self.discovery (repoID, query,
WSDL_URL)
```

FIG. 6A also contains the beginning of code script describing a method of obtaining a file extension from a document name. This segment of code is:

```
def get_extension (self, docname):
    *Gets file extension from Document Name*
    #Find the last occurrence of"." in the input string
    last_dot_index = docname.rfind(".")
```

FIG. 6B also shows an illustrative diagram in accordance with the principles of the disclosure. FIG. 6B is a continuation of FIG. 6A. FIG. 6B contains the end of code script describing a method of obtaining a file extension from a document name. This segment of code reads as follows:

```
# Check if a dot was found in the input string
if last_dot_index != -1:
    extension_type = docname[last_dot_index:]
else:
    #if no dot was found, return error,
    return "No extension found"
return str(extension_type)
```

FIG. 6B also contains a code segment describing the ability to change file permissions. This segment of code is:

```
def Change_file_permissions (self, path):
    for root, dirs, files in os.walk(path):
        for f in files:
            file_path = os.path.join(root, f)
            os.chmod(file_path, 0o755)
```

Finally, FIG. 6B contains a code segment describing the ability to change directory permissions. This segment of code reads as follows:

```
def Change_directory_permissions(self):
    directories = ['/apps/opt/filenetdocuments/standard', '/apps/opt/filenet
    documents/ad_hoc']
    path = 'apps/opt/filenetdocuments'
    for directory in directories:
        dir_path = os.path.join(path, directory)
        os.chmod(dir_path, 0o755)
```

Thus, apparatus and methods for FileNet data extraction automation are provided. Persons skilled in the art will appreciate that the present invention can be practiced by other than the described embodiments, which are presented for purposes of illustration rather than of limitation. The present invention is limited only by the claims that follow.

What is claimed is:

1. An apparatus for reducing a storage of confidential documents within a centralized data repository and increasing security within the centralized data repository, wherein the centralized data repository is an enterprise content management system used to manage and store documents and files, the apparatus comprising:
   a computing device;
   a processor within the computing device;
   a globally accessible site;
   wherein the globally accessible site is received on the computing device from a Data at Rest (DAR) team;
   said globally accessible site containing files within the centralized data repository;
   executing, using the processor on the computing device, a scanning application on the files within the centralized data repository;
   identifying, using the processor, whether the files contain a first comma separated values (CSV) file; and
   when the files contain a first CSV file, the apparatus:
      stores the first CSV file in a local memory address, the local memory address included in the centralized data repository where the first CSV file is being stored;
      extracts metadata from the first CSV file;
      sets script arguments comprising scan, env, start_date, and end_date;
      automatically passes a Unified User Management (UUM) key, service ID, and password into a UUM Authentication Service;
      automatically outputs a UUM Session Key from the UUM Authentication Service;
      automatically creates a Simple Object Access Protocol (SOAP) Application Programming Interface (API) Client using the UUM key to establish a connection to a Content Management Interoperability Services (CMIS) discovery and object service of the centralized data repository;
      creates a dictionary containing a sitelist of Uniform Resource Locators (URLs) as keys and an empty list as values;
      develops a query comprising a document ID, document name, a last modified by, and a true file path to form a base query;
      automatically creates a date range determined by a scan type of the scan script argument, the scan type comprising standard and ad hoc; and
      automatically runs a query statement to the CMIS discovery and object service for each key in the dictionary, using the sitelist of URLs, the creation date, and the base query; and
   when the files do not contain a first CSV file, the apparatus:
      manually emails the DAR team for instruction;
   and, following the query statement, the apparatus:
      outputs a second CSV file using the processor, the second CSV file being an outcome of the scanning application;
      identifies, using the processor, whether the URL contains documents; and
   when the URL contains documents, the apparatus:
      stores the documents in a new memory address, the new memory address included in the centralized data repository where the documents are being stored;
      appends the CSV file metadata to the dictionary;

calls an object service operation for each key in the dictionary to retrieve a content stream;

converts the content stream into a file object;

transfers the file object into a multiprotocol fileshare;

converts the contents of each item in the dictionary into CSV format;

writes the converted contents of each item in the dictionary into the second CSV file; and manually emails the second CSV file to the DAR team; and when the URL does not include documents, the apparatus:

removes the key and URL from the dictionary.

2. The apparatus of claim 1, wherein the globally accessible site is a web-based collaborative platform.

3. A method for reducing a storage of confidential documents within a centralized data repository and increasing security within the centralized data repository, wherein the centralized data repository is a an enterprise content management system used to manage and store documents and files, the method comprising:

receiving a globally accessible site from a Data at Rest (DAR) team on a computing device;

said globally accessible site containing files within the centralized data repository;

executing, using a processor on the computing device, a scanning application on the files within the centralized data repository;

identifying, using the processor, whether the files contain a first comma separated values (CSV) file;

when the files contain a first CSV file, the method comprises:

storing the first CSV file in a local memory address, the local memory address included in the centralized data repository where the first CSV file is being stored;

extracting metadata from the first CSV file;

setting script arguments comprising scan, env, start_date, and end_date;

automatically passing a Unified User Management (UUM) key, service ID, and password into a UUM Authentication Service;

automatically outputting a UUM Session Key from the UUM Authentication Service;

automatically creating a Simple Object Access Protocol (SOAP) Application Programming Interface (API) Client using the UUM key to establish connections to a Content Management Interoperability Services (CMIS) discovery and object service of the centralized data repository;

creating a dictionary containing a sitelist of Uniform Resource Locators (URLs) as keys and an empty list as values;

developing a base query comprising a document ID, document name, a last modified by, and a true file path;

automatically creating a date range determined by a scan type of the scan script argument, the scan type comprising standard and ad hoc; and automatically running a query statement to the CMIS discovery and object service for each key in the dictionary, using the sitelist of URLs, the creation date, and the base query; and when the files do not contain a first CSV file, the method comprises:

manually emailing the DAR team for instruction;

the method further comprising:

outputting, using the processor, a second CSV file, the second CSV file being an outcome of the scanning application;

identifying, using the processor, whether URLs within the sitelist of URLs contains documents;

when a URL contains documents, the method comprises:

storing the documents contained in the URL in a new memory address, the new memory address included in the centralized data repository where the documents are being stored;

appending the second CSV file metadata to the dictionary;

calling an object service operation for each key in the dictionary to retrieve a content stream;

converting the content stream into a file object;

transferring the file object into a multiprotocol fileshare;

converting the contents of each item in the dictionary to CSV format;

writing the converted contents of each item in the dictionary into the second CSV file; and manually emailing the second CSV file to the DAR team; and when the URL does not include documents, the method comprises:

removing the key and URL from the dictionary.

4. The method of claim 3, wherein the globally accessible site is a web-based collaborative platform.

* * * * *